Patented Jan. 15, 1935

1,988,374

UNITED STATES PATENT OFFICE 1,988,374

QUININE MERCURIC COMPOUND AND PROCESS OF MAKING IT

William E. Craig, Joplin, Mo.

No Drawing. Application May 25, 1932
Serial No. 613,555

11 Claims. (Cl. 260—13)

This invention relates to improvements in the art of medication and more particularly to improved processes and improved products over those disclosed in my co-pending application bearing Serial No. 121,885, filed July 12, 1926, which application is, in turn, a continuation of an application filed by me on October 10, 1925, bearing Serial No. 61,843. The present application is filed as a continuation in part of my said co-pending application Serial No. 121,885, filed July 12, 1926, having in mind the treatment of venereal diseases, and more particularly syphilis, insofar as the disclosure of said co-pending application coincides with the disclosure herein.

The object in view is the carrying out of an art for the production of a product indicated for venereal diseases, which product has been successfully used in effecting cures of such diseases, and particularly syphilis.

A further object is the production of a mercurial mass so compounded with other substances as to have the therapeutic actions of the several radicals of the mass effectively co-ordinated for enabling more intensified and more prolonged administration than possible with metallic mercury.

With these and further objects in view, as will in part hereinafter become apparent, and in part be stated, the invention comprises certain novel steps in the art of producing a mercurial compound.

In one mode of carrying out the steps of the process forming a part of the present invention to produce a product conforming to the invention, chemically pure hydrochloric acid is added to quinine alkaloid, and the mixture is dissolved in water to the point of complete solution. Hot water is preferably employed.

Corrosive mercuric chloride is then dissolved in water, preferably hot, and the two solutions are then mixed, preferably while hot, and allowed to cool. When cool, the completed solution is filtered. The precipitate is reserved, and is further treated by being agitated in fresh water and preferably left standing for a number of hours, say from eight to ten, or over night, and the resultant solution filtered. The precipitate thus obtained is dried, powdered, and filtered. The step of drying, obviously, of course, may be carried out by employing any suitable method for dehydrating. For example, the precipitate may be heated, subjected to treatment in an electric vacuum, or filtered. A fine white powder is the result, which has been found by carefully repeated qualitative and quantitative analyses to consist of a chemical compound, the molecular formula for one form of which is as follows:

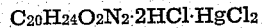

$$C_{20}H_{24}O_2N_2 \cdot 2HCl \cdot HgCl_2$$

The structural formula for said compound may be as follows:

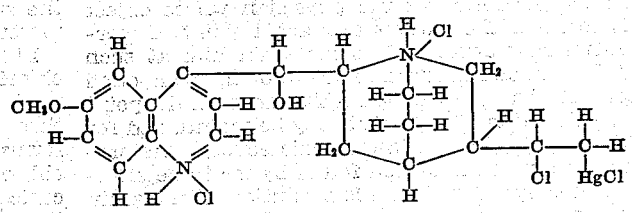

The preferable proportions (in excess) in one example for a given quantity of the compound and preferable manner of production, employing hydrochloric acid and quinine alkaloid, may be briefly stated as follows:

No. 1

| | |
|---|---|
| Quinine alkaloid | 3 oz. 105 gr. |
| Hydrochloric acid, CP | 2 oz. 85 gr. |
| Water (preferably hot) | 4 parts |

No. 2

| | |
|---|---|
| Mercuric chloride, corros | 5 oz. 188 gr. |
| Water (preferably hot) | 4 parts |

Dissolve No. 1 and No. 2, separately, in hot water. Mix hot. Allow to cool and filter. Reserve precipitate. Agitate with 8 parts fresh water, over-night, and filter, dehydrate, powder and refilter.

While in the above example I have referred to and use, preferably, hydrochloric acid, it is to be understood that other equivalent acids may also be employed. For example, instead of hydrochloric acid, I may employ acetic acid, citric acid, lactic acid, or other desirable organic acids. Regardless of the acid employed, however, the excess proportions of the several components in the above illustration and the procedure outlined remain the same.

Again, while I have referred to the employment of water as a solvent in carrying out the process of my invention, it is to be understood, of course, that other well-known solvents, such as alcohol, vegetable oils, or mineral oils, may be employed in lieu thereof.

The following tests prove the formula above given for the resulting dry powder:

When an accurately weighed portion of about one gram of said powder is dissolved in hot water and the mercury is precipitated by hydrogen sulphide and then calculated to metallic mercury from 27 to 28 per cent. is found. Theory content is 30 per cent.

When the residual liquor is freed from hydrogen sulphide by boiling and is then made alkaline with ammonia water the quinine precipitates and may be shaken out with ether. The results obtained in this manner are from 47 to 49 per cent. and the theory content is 48.48 per cent.

This variation occurring as stated above, is no doubt due to occlusion of some of the ingredients and also to a slight variation in moisture.

The powdered compound thus produced is the finished product and being soluble may be administered hypodermically by being dissolved in hot water, and the hypodermic administered intravenously, inter-muscularly, or otherwise. The remedy is also very effectively indicated for administration by the mouth, and when so administered is diluted preferably with sugar of milk. The extent of dilution with water, when applied hypodermically, and with sugar of milk when administered by the mouth, is susceptible of quite a wide range of variation, according to the condition and idiosyncrasies of the patient and within the discretion of the physician whose object is to cause the patient to reach a point of mercurial saturation and to maintain him at such point. A characteristic feature of the compound produced as above stated is the fact that the point of saturation of a patient may be maintained for prolonged periods without toxic effect. One proportion which has been found by me to be effective for hypodermic use is a solution of one grain of the compound to about 18 c.c. of water, or two grains of the compound to about 36 c.c. of water. The solution should be at approximately blood temperature when administered for best results. I have also obtained excellent results with a somewhat stronger solution where the patient's condition indicated greater need for mercury. For example, I have utilized as high as two grains of the compound to 18 c.c. of water. The full range of possible strength will vary considerably with different patients, and should be determined in each particular case by the attending physician, and he will always find it safe and satisfactory to start with one grain of the compound to 18 c.c. of water. When the compound is to be administered by the mouth, the finished powder may be diluted in any of quite a wide range of different proportions. One effective set of proportions consists of one part of the powdered compound to five parts of sugar of milk thoroughly triturated and made up into three-grain tablets in a tablet machine.

When utilizing the proportions of diluent water or sugar of milk, as stated, treatment of an average case may be indicated as consisting of one hypodermic injection per day for three days; three to five injections distributed over the succeeding ten days, and repeating as the condition of the patient demands, giving in conjunction therewith one, two or three tablets per day by the mouth until the attending physician is satisfied that the patient is being saturated. After the patient has reached this stage, administration is continued in quantities sufficient for maintaining saturation until the results desired are obtained, as indicated by the disappearance of all external and clinical symptoms and as evidenced by accepted scientific tests.

In addition to the adaptability of the remedy for effective use either hypodermically, locally, or orally, it is also especially well adapted for use with beneficial results where a clinical condition indicates an unction use as by administration in the form of a salve or powder. When a salve is to be prepared from the compound, the powdered product may be triturated with an appropriate vehicle, such as a petroleum, vegetable oil or ointment base, or other appropriate fatty, medicated mixture.

While I find it essential for effective results to prepare the quinine alkaloid and hydrochloric acid solution separately from the corrosive mercuric chloride solution, and subsequently mixing the two solutions, I do not desire to be limited to this manner of production, as it may develop that, under certain special conditions, the compound may be produced by an admixture of all of the constituents in a single initial solution.

While I shall refer in the appended claims to the corrosive mercuric chloride as such, it should be understood that its chemical equivalent is intended to be covered by the naming of this chemical product. That is to say, it is apparent that substances may be utilized to form corrosive mercuric chloride in solution, and such substances or their equivalents are intended to be included in the substance named in the claims as corrosive mercuric chloride.

Furthermore, while I prefer the use of mercuric chloride ($HgCl_2$), it will be obvious that the advantages of the invention may be also obtained through the employment of mercury in other forms; as for example, in the form of mercurous chloride ($HgCl$), mercuric chloride urea, or mercuric anilinate, and it is contemplated therefore that my invention embraces the use of mercury in such additional forms.

It is also apparent that the recitation in the claims of the specific names for the other chemical constituents is likewise intended to comprehend their chemical or therapeutical equivalents insofar as such chemical or therapeutical equivalents may be found capable of producing the product herein disclosed or its chemical or therapeutical equivalent. For example, instead of employing quinine alkaloid, I may use any suitable chemical equivalent thereof such as quinine hydrochloride, quinine dihydrochloride or quinine sulphate.

I claim as my invention:—

1. A method for producing a mercury-quinine compound, comprising reacting a chloride of mercury alone in solution with quinine in hydrochloric acid and recovering the reaction product.

2. The art of producing a mercury-quinine compound, comprising admixing quinine alkaloid, hydrochloric acid and a chloride of mercury alone in solution, and recovering the reaction product.

3. A method of producing a mercury-quinine compound, comprising reacting a chloride of mercury alone in hot solution with a quinine alkaloid in hydrochloric acid and recovering the reaction product.

4. A method of producing a mercury-quinine medicinal compound, comprising forming separate solutions of a chloride of mercury alone in a solvent, quinine in hydrochloric acid, admixing said solutions, recovering the reaction product and filtering, dehydrating and powdering the same.

5. A method of producing a mercury-quinine medicinal compound, comprising forming separate hot solutions of a chloride of mercury alone in a solvent, quinine in hydrochloric acid, admixing said solutions, recovering the reaction product and filtering, dehydrating and powdering the same.

6. A method of producing a mercury-quinine medicinal compound, comprising reacting bichloride of mercury alone in solution with a quinine alkaloid in hydrochloric acid and recovering the resultant precipitate.

7. The art of producing a medicine, comprising forming separate hot solutions of mercuric chloride alone in a solvent, quinine alkaloid in hydrochloric acid, admixing the two solutions and recovering the reaction product.

8. A quinine hydrochloride mercury bichloride.

9. Quinine monohydrochloride mercury bichloride.

10. Quinine dihydrochloride mercury bichloride.

11. A compound having the structural formula,

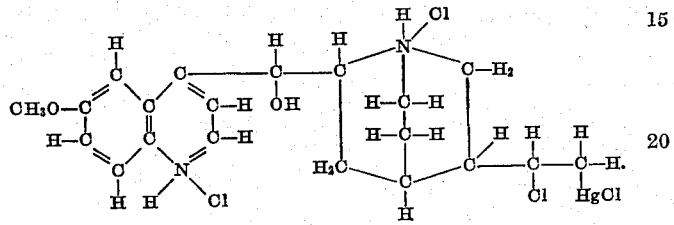

WILLIAM E. CRAIG.